(12) United States Patent
Dray, Jr.

(10) Patent No.: US 10,778,436 B2
(45) Date of Patent: Sep. 15, 2020

(54) ACTIVE SECURITY TOKEN WITH SECURITY PHANTOM FOR PORTING A PASSWORD FILE

(71) Applicant: Government of the United States of America, as represented by the Secretary of Commerce, Gaithersburg, MD (US)

(72) Inventor: James F. Dray, Jr., Myersville, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 208 days.

(21) Appl. No.: 15/661,214

(22) Filed: Aug. 23, 2017

(65) Prior Publication Data

US 2018/0069704 A1 Mar. 8, 2018

Related U.S. Application Data

(60) Provisional application No. 62/384,814, filed on Sep. 8, 2016.

(51) Int. Cl.
*G06F 21/00* (2013.01)
*H04L 9/32* (2006.01)
*H04L 29/06* (2006.01)

(52) U.S. Cl.
CPC .......... *H04L 9/3231* (2013.01); *H04L 9/3247* (2013.01); *H04L 9/3263* (2013.01); *H04L 63/083* (2013.01)

(58) Field of Classification Search
CPC combination set(s) only.
See application file for complete search history.

(56) References Cited

U.S. PATENT DOCUMENTS

| | | | |
|---|---|---|---|
| 6,317,834 B1 * | 11/2001 | Gennaro | H04L 9/14 713/186 |
| 7,386,722 B2 | 6/2008 | Umezawa et al. | |
| 7,430,668 B1 | 9/2008 | Chen et al. | |
| 10,275,768 B2 * | 4/2019 | Gardiner | G06K 9/00087 |
| 2004/0034784 A1 * | 2/2004 | Fedronic | G06Q 20/347 713/186 |
| 2007/0040017 A1 * | 2/2007 | Kozlay | G06K 19/07354 235/380 |

(Continued)

OTHER PUBLICATIONS

"Yuanyuan Zhou, Shize Guo, SPA-based Security Evaluation of RSA Implementation in Internet Banking USB Token, Oct. 21-23, 2011, IEEE, INSPEC# 12556560" (Year: 2011).*

(Continued)

*Primary Examiner* — Phy Anh T Vu
(74) *Attorney, Agent, or Firm* — Office of Chief Counsel for National Institute of Standards and Technology

(57) ABSTRACT

An active security token includes: a sentry that controls access to token data disposed on the active security token through verification of user authentication data; the token data including: reference authentication data for verification of user authentication data; and a security phantom including a password file, the security phantom being a public key certificate or a biometric template.

7 Claims, 3 Drawing Sheets

(56) References Cited

U.S. PATENT DOCUMENTS

| | | | | |
|---|---|---|---|---|
| 2007/0250718 | A1* | 10/2007 | Lee | H04L 9/0662 |
| | | | | 713/186 |
| 2007/0288689 | A1* | 12/2007 | Lu | G06F 21/34 |
| | | | | 711/103 |
| 2009/0132819 | A1* | 5/2009 | Lu | G06Q 20/10 |
| | | | | 713/169 |
| 2009/0265769 | A1* | 10/2009 | Lu | G06F 17/243 |
| | | | | 726/6 |
| 2010/0138667 | A1* | 6/2010 | Adams | G06F 21/32 |
| | | | | 713/186 |
| 2017/0161699 | A1* | 6/2017 | Wu | G06Q 20/341 |

OTHER PUBLICATIONS

"Asad M. Ali, Seamless Fusion of Secure Software and Trusted USB Token for Protecting Enterprise & Government Data, Aug. 22-26, 2011, IEEE, INSPEC#12325885" (Year: 2011).*

"Li MeiHong, Liu JiQiang, USB Key-Based Approach for Software Protection, May 15-16, 2009, IEEE, INSPEC#10749896" (Year: 2009).*

* cited by examiner

ACTIVE SECURITY TOKEN WITH SECURITY PHANTOM FOR PORTING A PASSWORD FILE

CROSS REFERENCE TO RELATED APPLICATIONS

This application claims the benefit of U.S. Provisional Patent Application Ser. No. 62/384,814, filed Sep. 8, 2016, the disclosure of which is incorporated herein by reference in its entirety.

STATEMENT REGARDING FEDERALLY SPONSORED RESEARCH

This invention was made with United States Government support from the National Institute of Standards and Technology, an agency of the United States Department of Commerce. The Government has certain rights in the invention.

BRIEF DESCRIPTION

Disclosed is an active security token comprising: a sentry that controls access to token data disposed on the active security token through verification of user authentication data; the token data comprising: reference authentication data for verification of user authentication data; and a security phantom comprising a password file, the security phantom being a public key certificate or a biometric template.

Also disclosed is a process for making an active security token, the process comprising: providing an active security token; producing a security phantom comprising a password file, the security phantom being a public key certificate or a biometric template; and storing the security phantom on the active security token to make the active security token.

Further disclosed is a process for obtaining a password from an active security token, the process comprising: providing the active security token; communicating with a host by the active security token; requesting the security phantom by the host; communicating the security phantom from the active security token; and receiving the security phantom by the host from the active security token to obtain the password.

Also disclosed is a computer-implemented method, comprising: producing a security phantom comprising a password file, the security phantom being a public key certificate or a biometric template; storing the security phantom; communicating with a host; requesting the security phantom by the host; communicating the security phantom; receiving the security phantom by the host to obtain the password; receiving user authentication data; validating the user authentication data against reference authentication data; determining whether the user authentication data matches the reference authentication data; providing access to the password file in the security phantom if the user authentication data matches the reference authentication data; identifying the password in the security phantom; and logging into a password-protected host with the password obtained from the security phantom.

Also disclosed is a system comprising: one or more computers configured to perform operations, the operations comprising: producing a security phantom comprising a password file, the security phantom being a public key certificate or a biometric template; storing the security phantom; communicating with a host; requesting the security phantom by the host; communicating the security phantom to the host; receiving the security phantom by the host; receiving user authentication data; validating the user authentication data against reference authentication data; determining whether the user authentication data matches the reference authentication data; providing access to the host to the password file in the security phantom if the user authentication data matches the reference authentication data; identifying the password in the security phantom; and logging into a password-protected host with the password obtained from the security phantom.

Also disclosed is a computer-readable medium having instructions stored thereon, which, when executed by a processor, cause the processor to perform operations comprising: producing a security phantom comprising a password file, the security phantom being a public key certificate or a biometric template; storing the security phantom; communicating with a host; requesting the security phantom by the host; communicating the security phantom to the host; receiving the security phantom by the host; receiving user authentication data; validating the user authentication data against reference authentication data; determining whether the user authentication data matches the reference authentication data; providing access to the host to the password file in the security phantom if the user authentication data matches the reference authentication data; identifying the password in the security phantom; and logging into a password-protected host with the password obtained from the security phantom.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
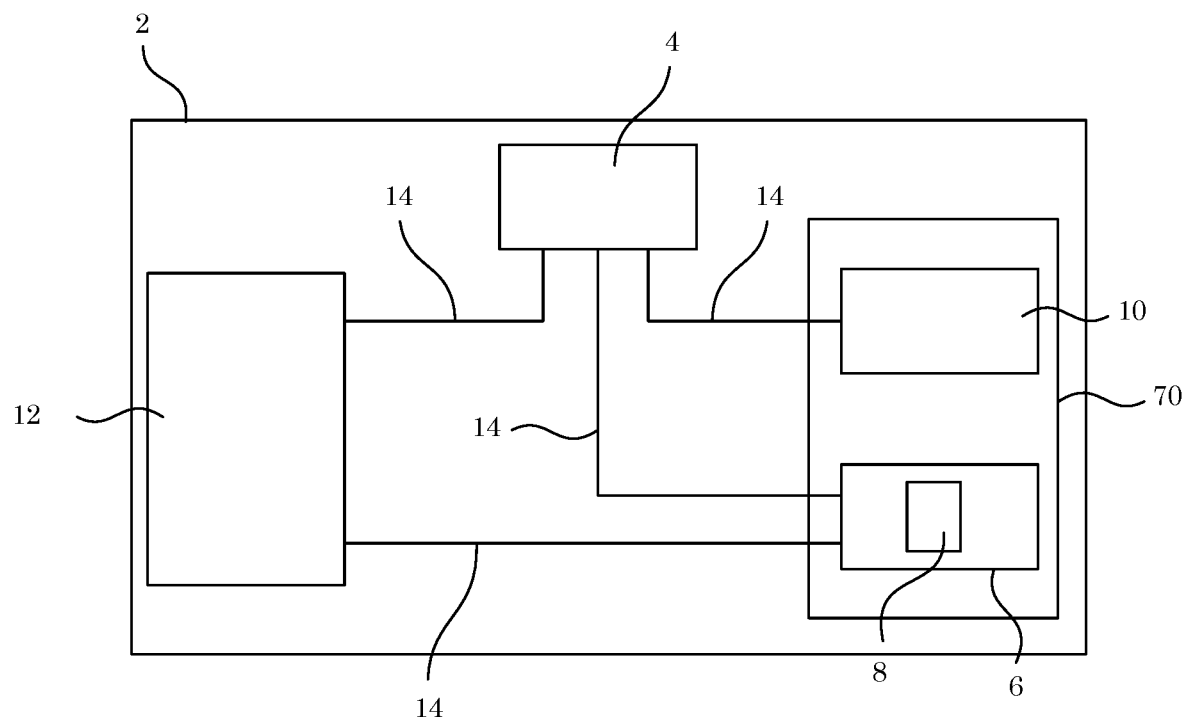
FIG. 1 shows an active security token.

A detailed description of one or more embodiments is presented herein by way of exemplification and not limitation.

It has been discovered that an article (e.g., an active security token) and a process herein provide storing a password file that can include a username and a corresponding password or database thereof on a software or hardware security module (e.g., an active security token such as a smart card, universal serial bus (USB) security token, and the like) in which the active security token has an absence of native password database storage capability. Advantageously and unexpectedly, an external application can access and use the password database to automatically log on to a network service such as a web server. Although some active security tokens do not explicitly support storage of password databases or do not allow an implementer to store an arbitrary file on the active security token, the articles and processes described herein include a security phantom that emulates a public key certificate or a biometric template that is an object to contain the password file and which overcomes these limitations. Beneficially, a normal username and password logon process of a network service can be used with a password and username obtained from the security phantom to log into the network service.

In an embodiment, the active security token provides storage and access to a password file (e.g., including a password database) on a security module (e.g., a hardware security module or software security module) that does not natively include this capability (i.e., storage or access to the password file). Moreover, the active security token provides secure password database management, e.g., to a conventional security module product without changing such conventional security module product. Additionally, the active security token is compatible with password-based logon processes used by web and other network servers. Advantageously, the active security token overcomes a need to change a security module functionality server logon process.

Commercially available security modules provide cryptographic operations such as key generation, public key certificate storage, digital signature generation, and encryption. However, such conventional security modules typically do not provide storage capabilities for password databases nor for general data file storage. Unexpectedly, the active security token embeds a password file that can include a password database, on a security module, in another security object such as a public key certificate or and biometric template. These other security objects are stored on and retrievable from the security module by an external application using a native interface of the security module.

Moreover, with regard to certain security objects, conventional security modules often do not process or parse them internally. As a result, the security object can include arbitrary content. According to an embodiment, a user can store a security object on an active security token (e.g., a security module) and provide the active security token with the password file in a raw form. Header information can be included in the password file. Header information can include an object identifier, tag-length value, or the like that the active security token requires for that type of security object.

In an embodiment, the content of a security object is checked and validated by a security module, and a security object is prepared with the correct format such that the password file is encoded in a sub-element or field of the security object.

In an embodiment, the security object can include an optional field or noncritical field that can be used as a container for the password file while maintaining conformance to a formal specification for the security object. In an embodiment, an X.509 public key certificate that passes a validity check is prepared with a field or extension that includes the password file embedded therein.

In an embodiment, the password file is secured so that a legitimate user can access the password file on the active security token. Here, the password file is stored in a security object that the active security token protects with a personal identification number (PIN) or master password. It is contemplated that the user provides a PIN or master password to the active security token before the active security token provides access by an application to read the password file.

In an embodiment, the password file can be included on the active security token by encrypting the password file before the password file is stored on the active security token. Here, an external application reads the encrypted password file stored on the active security token and obtains a PIN or password from the user to decrypt the password file.

Advantageously and unexpectedly, storing the password file on the active security token overcomes the problem of storing password file on security modules that do not natively provide this functionality. Further, storing the password file on the active security token overcomes a lack of secure password management in the online world by adding a new capability to existing security modules and server logon systems without requiring design changes to those systems.

In an embodiment, with reference to FIG. 1, active security token 100 includes sentry 4 that controls access to token data 70 disposed on active security token 100, wherein access to token data 70 is accomplished through verification of user authentication data 72. Active security token 100 also includes token data 70 including: reference authentication data 10 for verification of user authentication data 72; and security phantom 6 including password file 8. It is contemplated that security phantom 6 can be a public key certificate or a biometric template. Active security token 100 also can include interface 12 in communication with sentry 4 and security phantom 6 via wire 14. Additionally, sentry 4 can be in communication with token data 70 via wire 14. Components of active security token 100 can be disposed on substrate 2.

Figure 2:
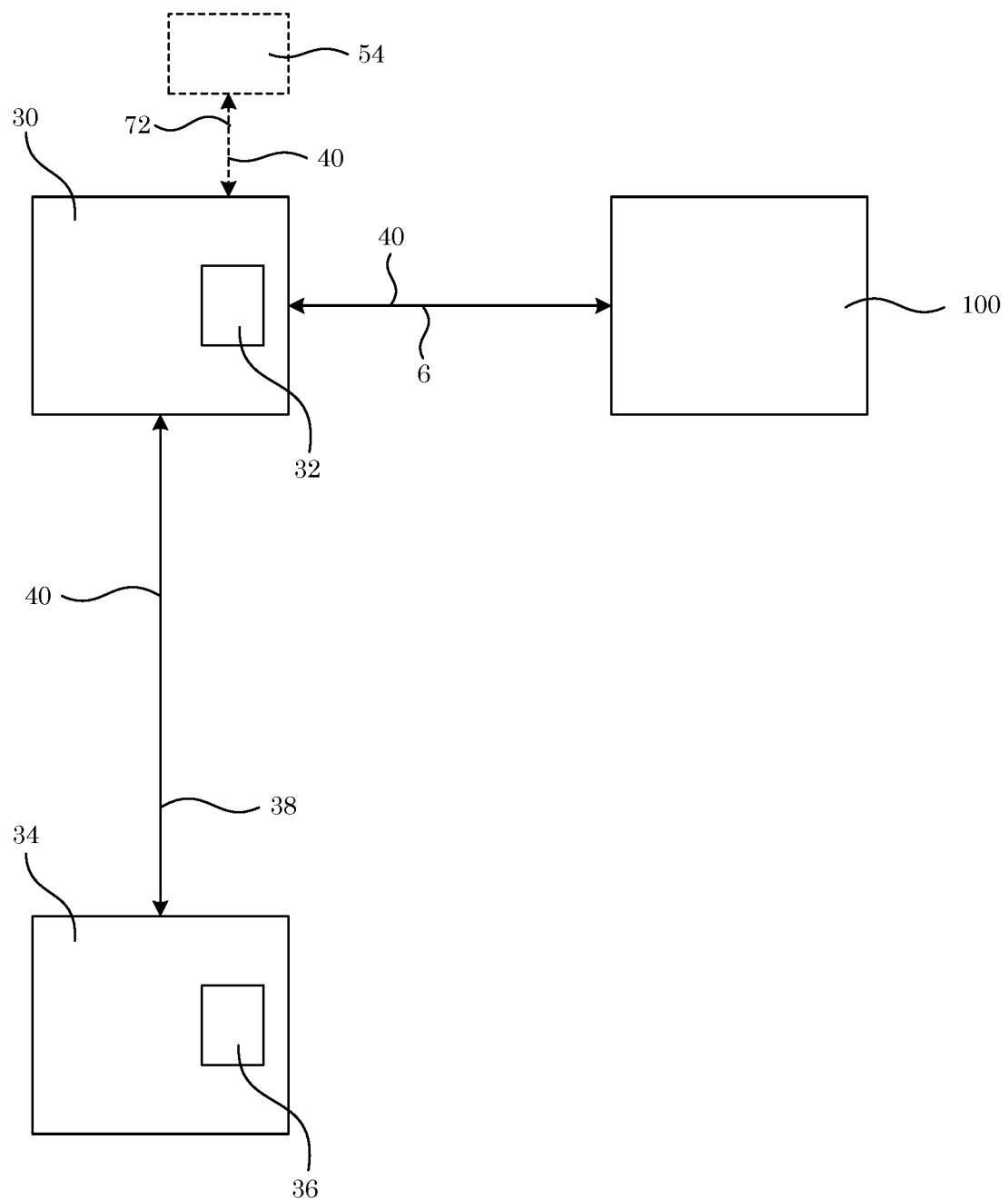
FIG. 2 shows communication of a security phantom.

In an embodiment, with reference to FIG. 2 system 102 includes active security token 100 in communication with host 30 via communication channel 40. In this manner, active security token 100 can communicate security phantom 6 to host 30 via communication channel 40. Such communication can occur at active security token 100 through interface 12. User 54 can be in communication with host 30 via communication channel 40. Host 30 can include password courier 32 that identifies a password or username in password file 6 received from active security token 100. User 54 can provide user authentication data 72 to host 30 via communication channel 40. Host 30 can communicate password 38 from password file 6 to network service 34 via communication channel 40. Network service 34 can include login manager 36 to log into a service with password 38 received from host 30. Thereafter, service can be provided from network service 34 to host 30. It should be appreciated that such service is predicated upon communication of password file 8 from security phantom 6 disposed on active security token 100 to host 30.

Figure 3:
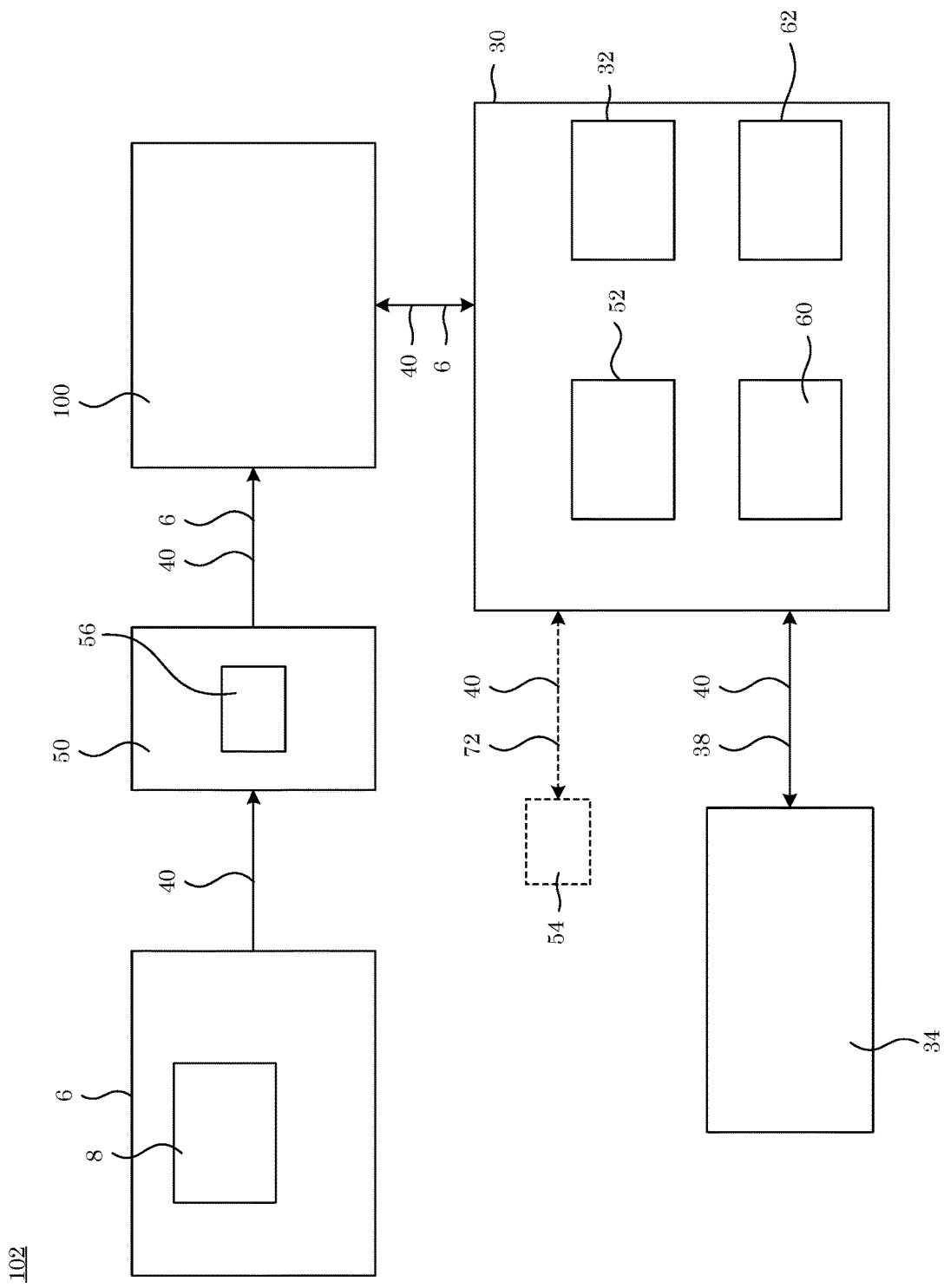
FIG. 3 shows communication of a security phantom.

In an embodiment, with reference to FIG. 3, system 102 includes communication of security phantom 6 with password file 8 to administrator 50 over communication channel 40. Administrator 50 includes application programming interface 56. Application programming interface 56 includes a function for storing a certificate on active security token 100. In this regard, administrator 50 uses the function for storing the certificate to communicate and to store security phantom 6 that contains password file 8 on active security token 100. Active security token 100 receives security phantom 6 from administrator 50 and provides security phantom 6 to host 30 over communication channel 40. Host 30 receives security phantom 6 from active security token 100. Here, host 30 includes password courier 32 to identify and retrieve password file 8 from security phantom 6. Host 30 also can include application programming interface 52 accessible by user 54 in which user 54 communicates user authentication data via application programming interface 52 to host 30. Upon authentication of user authentication data 72 by active security token 100 against reference authentication data 10, password courier 32 can supply the password from password file 8 to an application, e.g., web browser 60, plug-in 62, and the like, included on host 30. Web browser 64 or plug-in 62 can communicate with network service 34 through communication channel 40, wherein password 38 from password file 8 is provided to network service 34 for provision of a service from network service 34 to user 54 from host 30 via web browser 60. Plug-in 62 can automate unlocking of password 38 from password file 8 in security phantom 6 and provision of password 38 to network service 34. It is contemplated that plug-in 62 can interwork with password courier 32 so that plug-in 62 instantiates an instance of password courier 32 that identifies and retrieves password 38 from password file 8 in security phantom 6 that was transferred from active security token 100. Accordingly, plug-in 62 can be plug-in for web browser 60, a standalone program, a script, and the like.

Active security token 100 can be a security module such as a personal identification verification card, universal serial bus (USB) token, credit card, identification card, smart card, software security module, and the like. Software security modules emulate the functionality of hardware security modules in software that executes on general purpose computing platforms. In an embodiment, active security token 100 is the personal identification verification card. In an embodiment, active security token 100 is the credit card that includes a chip. Active security token 100 can include substrate two on which components are disposed. Substrate 2 can be made of any material effective to provide disposition of the components thereon. Exemplary materials for substrate 2 include a plastic, metal, composite, and the like.

Interface 12 disposed on active security token 100 provides external communication with sentry 4 and token data 70. Interface 12 can be electronic circuit, and optical interface, and the like. Moreover, interface 12 can communicate via mechanical contact, wireless contact, electrical contact, optical contact, or a combination thereof with user 54, host 30, and the like. It is contemplated that interface 12 provide communication, e.g., with a card reader when active security token 100 is a card, e.g., a PIV card or the like.

Interface 12 communicates with sentry 4 and token data 70 via wire 14. Wire 14 can be an electrically conductive medium (e.g., gold trace or the like) or other material for communicating data through interface 12 to sentry 4 and other components of active security token 100.

Sentry 4 resides on active security token 100, receiving user authentication data 72 through interface 12 and comparing it to reference authentication data 10 previously stored on active security token 100. If received user authentication data 72 matches previously stored reference authentication data 10, sentry 4 grants access to security phantom 6 stored on active security token 100 via interface 12. If received user authentication data 72 does not match previously stored reference authentication data 10, sentry 4 denies access to security phantom 6 stored on active security token 100 via interface 12.

Token data 70 includes reference authentication data 10 and security phantom 6. Token data 70 is constructed according to internal formatting rules specific to each embodiment of active security token 10.

Reference authentication data 10 includes a password, PIN, biometric template, or other authentication data element in which sentry 4 compares reference authentication data 10 to user authentication data 72 to grant or deny access to security phantom 6 via interface 12 depending on success or failure of such comparison.

Security phantom 6 includes password file 8 such as a data object represented as a public key certificate or biometric template. Security phantom 6 can include password file 8 in raw form (i.e., unmodified or partially unmodified) that is transferred to and stored on active security token 100. It is contemplated that security phantom 6 can be a data object structured to conform with a formatting rule for a public key certificate or biometric template for active security token 100.

Password file 8 is a data object that can contain password 38 and a corresponding username also referred to in combination as user credentials. In addition, password file 8 can contain an identifier for the service associated with a set of user credentials. Password 38 is constructed according to the requirements of the host service for acceptable passwords, which can vary from one service to another. Accordingly, the username requested to log in to a service can be subject to the formatting requirements of that service.

In an embodiment, password file 8 includes a password database. Here, the password database contains zero or more records including passwords, usernames, optional service identifiers, and the like, or a combination thereof. A processing element external to active security token 100, such as password courier 32, may use the optional service identifiers as an index to retrieve the appropriate combination of username and password for a specific service.

Active security token 100 communicates security phantom 6 to host 30 via communication channel 40. Communication channel 40 can be a mechanism that transfers digital information between active security token 100 and host 30, including electrical wires and contacts, and optical, radio frequency, electromagnetic, and audio signals.

Host 30 can be a desktop computer, terminal, laptop, tablet, smart phone, or other computing device with a user interface. Host 30 mediates the transfer of data between user 54, active security token 100, and network service 34.

Host 30 communicates with user 54 to receive user authentication data 72 therefrom. User 54 indicates a desire to access network service 34, initiating the logon process. Host 30 responds to this request by collecting user authentication data 72 from user 54 via a user interface such as a keyboard, mouse, touchpad, voice recognition package, biometric scanner, or other human-machine interface. User authentication data 72 includes, e.g., a password, PIN, biometric scan, or other suitable authenticator is transmitted via interface 12 to active security token 100. Here, host 30 includes password courier 32. Password courier 32 manages the process of sending user authentication data 72 to active authentication token 100, retrieving security phantom 6 from active security token 100, and extracting the username and password associated with desired network service 34 from security phantom 6.

Further, host 30 communicates with network service 34. Network service 34 includes a service that user 54 wishes to access. Network service 34 requires a username and password from user 54 that is verified before user 54 is granted access to network service 54.

Login manager 36 can be included in network service 34 as a software module receives username and password from host 30 via communication channel 40. Login manager 36 verifies username and password and, if verification succeeds, grants user 54 access to network service 34.

In some embodiments, active security token 100 communicates with administrator 50. Administrator 50 is responsible for constructing the elements of token data 70 and storing said elements on active security token 100.

Administrator 50 or host 30 can include application programming interface (e.g., 52, 56). Application programming interfaces provide functions for storing token data 70 on active Host 30 can include plug-in 62 that integrates with applications such as web browsers installed on host 30. Plug-in 62 is specific to a given application and enables said application executing on host 30 to use active security token 100 for login to network service 54. The plug-in and password courier can be separate elements or can be unique elements.

Additionally, host 30 can communicate with network service 34. Network service 34 can be, e.g., a web service such as webmail, an online retail store, a bank account, social media, and the like. Such service can require users to log on to prevent attackers from accessing user accounts and services. Passwords are a common form of user authentication among online services.

Active security token 100 has numerous beneficial uses, including performing secured data exchange between host 30 and network service 34. To accomplish secured data exchange, active security token 100 can be made in various ways. In an embodiment, a process for making active security token 100 includes providing a medium for storing security phantom 6 thereon. The medium for storing can be made by fabricating an integrated circuit (chip) containing a processor, memory, and a communications interface and embedding or otherwise attaching this chip to a substrate such as a plastic card, USB casing, or the like. The processor is required on the medium for storing security phantom 6 because sentry 4 is an executable program. Simple memory devices without processors are therefore unsuitable as a medium for making active security token 100 because sentry 4 cannot be implemented on such devices. The process for making active security token 100 includes: providing active security token 100; producing security phantom 6 including password file 8, security phantom 6 being a public key certificate or a biometric template; and storing security phantom 6 on active security token 100 to make active security token 100.

In an embodiment, producing security phantom 6 includes calling an API function for storing a certificate on active security token 100; and storing password file 8 as security phantom 6 on active security token 100 in response to calling the API function for storing the certificate.

In an embodiment, producing security phantom 6 includes producing security phantom 6 as the public key certificate that includes a verifiable certificate field; calling an API function for storing a certificate on active security token 100; and storing security phantom 6 on active security token 100 in response to calling the API function for storing the certificate.

According to an embodiment, a process for obtaining password 38 from active security token 100 includes: providing active security token 100; communicating with host 30 by active security token 100; requesting security phantom 6 by host 30; communicating security phantom 6 from active security token 100; and receiving security phantom 6 by host 30 from active security token 100 to obtain password 38. The process further can include: providing user authentication data 72 to active security token 100; validating user authentication data 72 against reference authentication data 10 stored on active security token 100; determining, by active security token 100, whether user authentication data 72 matches reference authentication data 10; and providing access to security phantom 6 if user authentication data 72 matches reference authentication data 10. The process also can include identifying password 38 in security phantom 6. Password 38 is used to log into password-protected host 30 with password 38 obtained from security phantom 6.

Active security token 100 can be used in various environments. In an embodiment, a computer-implemented method includes: producing security phantom 6 including password file 8, security phantom 6 being a public key certificate or a biometric template; storing the security phantom; communicating with host 30; requesting security phantom 6 by host 30; communicating security phantom 6; receiving security phantom 6 by host 60 to obtain password 38; receiving user authentication data 72; validating user authentication data 72 against reference authentication data 10; determining whether user authentication data 72 matches reference authentication data 10; providing access to password file 8 in security phantom 6 if user authentication data 72 matches reference authentication data 10; identifying password 38 in security phantom 6; and logging into password-protected host 30 with password 38 obtained from security phantom 6. In the computer-implemented method, producing security phantom 6 can include: calling an API function for storing a certificate; and storing password file 8 as security phantom 6 in response to calling the API function for storing the certificate. In some embodiments of the computer-implemented, producing security phantom 6 includes: producing security phantom 6 that further includes a verifiable certificate field prior to calling the API function for storing the certificate on active security token 100 and prior to storing security phantom 6 on active security token 100 in response to calling the API function for storing the certificate. As used herein, "verifiable certificate" refers to a data structure constructed according to a set of specifications such that a parser with knowledge of these specifications can verify conformance by analyzing the data structure and comparing it to the specifications. Additionally, verifiable conformance to certificate specifications enables parsers to retrieve elements or fields from verifiable certificates. It should be noted that certificate verification is not a monolithic process; many different levels of verification are possible due to the complexity of public key certificate standards. A compendium of public key certificate standards and specifications are available via an Internet such and from organizations such as the Organization for the Advancement of Structured Information Standards (OASIS), which is a nonprofit consortium involved in development, convergence, and adoption of open standards for information technology, in promotion of industry consensus, and in production of worldwide standards for security, Cloud computing, Internet of Things, the Smart Grid, content technologies, and emergency management.

Active security token 100 can be included in a system. In an embodiment, a system includes: one or more computers configured to perform operations, the operations including: producing security phantom 6 including password file 8, security phantom 6 being a public key certificate or a biometric template; storing security phantom 6; communicating with host 30; requesting security phantom 6 by host 30; communicating security phantom 6 to host 30; receiving security phantom 6 by host 30; receiving user authentication data 72; validating user authentication data 72 against reference authentication data 10; determining whether user authentication data 72 matches reference authentication data 10; providing access to host 30 to password file 8 in security phantom 6 if user authentication data 72 matches reference authentication data 10; identifying password 38 in security phantom 6; and logging into password-protected host 30 with password 38 obtained from security phantom 6. In the computer-implemented, producing security phantom 6 can include: calling an API function for storing a certificate; and storing password file 8 as security phantom 6 in response to calling the API function for storing the certificate. In the computer-implemented method, producing the security phantom 6 can include: producing security phantom 6 that further includes a verifiable certificate field prior to calling the API function for storing the certificate on active security token 100 and prior to storing security phantom 6 on active security token 100 in response to calling the API function for storing the certificate.

According to an embodiment, a computer-readable medium having instructions stored thereon, which, when executed by a processor, cause the processor to perform operations including: producing security phantom 6 including password file 8, security phantom 6 being a public key certificate or a biometric template; storing security phantom 6; communicating with host 30; requesting security phantom 6 by host 30; communicating security phantom 6 to host 30; receiving security phantom 6 by host 30; receiving user authentication data 72; validating user authentication data 72 against reference authentication data 10; determining whether user authentication data 72 matches reference authentication data 10; providing access to host 30 to password file 8 in security phantom 6 if user authentication data 72 matches reference authentication data 10; identifying password 38 in security phantom 6; and logging into password-protected host 30 with password 38 obtained from security phantom 6. Here, producing security phantom 6 can include: calling an API function for storing a certificate; and storing password file 8 as security phantom 6 in response to calling the API function for storing the certificate. Also, here, producing the security phantom 6 can include: producing security phantom 6 that further includes a verifiable certificate field prior to calling the API function for storing the certificate on active security token 100 and prior to storing security phantom 6 on active security token 100 in response to calling the API function for storing the certificate.

Active security token 100 has numerous advantageous and beneficial properties. In an aspect, active security token 100 provides the ability to store password databases on security tokens that do not intrinsically have this capacity, adding a new capability to existing commercial products. In another aspect, active security token 100 enables users to securely carry password databases from one host system to another. In another aspect, active security token provides a higher level of password management assurance without requiring programmatic changes to existing security tokens and network server login components.

Advantageously, active security token 100 provides storage of password database as a payload in a security object where elements of the security object are critical to the operating process of a given security module. Beneficially, active security token 100 provides protection for plaintext passwords while such password is in use by an external user or application and deletion of the password from memory after use to avoid compromise of the password. Further, active security token 100 provides storage of plaintext password databases on security modules, wherein the sentry requires a PIN or password to access the password database.

The articles and processes herein are illustrated further by the following Example, which is non-limiting.

EXAMPLE

With reference to FIGS. 1, 2, and 3, a personal identity verification (PIV) security card is a cryptographic authentication token carried by all federal employees, mandated by Homeland Security Presidential Directive 12 and specified in Federal Information Processing Standards publication 201 and other documents. Password database files cannot be stored on the PIV card explicitly, but PIV cards can contain public key certificates and biometric templates. A PIV card can therefore serve as the medium for making active security token 100.

Administrator 50 generates security phantom 8 and invokes the PIV card application programming interface 56 function to store a certificate on the card as defined in NIST Special Publication 800-73-4. In response to this function call security phantom 8 is stored in one of the card's memory slots reserved for public key certificates. The card is provided to user 54, and user 54 uses the card to log on to a webmail service as follows. User 54 indicates to host 30 that they wish to access the webmail service (network service 34) by entering the URL of the webmail service in a browser resident on host 30. Browser plug-in 62 prompts user 54 for user authentication data 72 in the form of a PIN. User 54 enters the PIN and plug-in 62 transmits this PIN to the card. Sentry 4 verifies the PIN against reference authentication data 10 and grants access to security phantom 8 stored in a public key certificate slot on the card. Plug-in 62 retrieves security phantom 8 from the card via communication channel 40, parses security phantom 8, extracts the username and password for the webmail service, and provides these to host 30. Host 30 communicates the username and password to the webmail service login manager 36, which verifies the password and grants user 54 access to the webmail service. In this manner, the active security token is provisioned with a security phantom that includes a password that is ported from one device to another.

Embodiments of the subject matter and the operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more computers executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, workstations, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic; magneto-optical disks, optical disks, USB drives, and so on. However, a computer need not have such devices. Moreover, a computer can be embedded in another device, e.g., a mobile telephone, a personal digital assistant (PDA), a microwave oven, mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The central processing unit and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). Such interconnects may involve electrical cabling, fiber optics, or be wireless connections.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. An active security token comprising:
    a sentry module that controls access to token data disposed on the active security token through verification of user authentication data;
    and the token data comprising:
        reference authentication data for verification of user authentication data; and
        a security phantom comprising a password file, the security phantom being a public key certificate, wherein the security phantom is present on the active security token in an absence of native password storage.

2. The active security token of claim 1, wherein the password file comprises a password.

3. The active security token of claim 1, wherein the password file comprises a password database, the password database comprising: a password; and a username corresponding to the password.

4. The active security token of claim 1, wherein the password file is encrypted.

5. The active security token of claim 1, wherein the security phantom is encrypted.

6. The active security token of claim 1, wherein the active security token further comprises a smart card or a universal serial bus token.

7. The active security token of claim 6, wherein the smart card comprises a personal identity verification card.

* * * * *